United States Patent
Nakashima et al.

(10) Patent No.: US 9,718,097 B2
(45) Date of Patent: Aug. 1, 2017

(54) METHOD OF FORMING A MULTI-LAYER PAINT FILM

(71) Applicant: BASF Coatings GmbH, Münster (DE)

(72) Inventors: Hisayuki Nakashima, Kanagawa (JP); Souichi Mori, Kanagawa (JP); Takamasa Miyamoto, Yokohamashi (JP)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 14/410,675

(22) PCT Filed: May 23, 2013

(86) PCT No.: PCT/EP2013/060593
§ 371 (c)(1),
(2) Date: Dec. 23, 2014

(87) PCT Pub. No.: WO2014/000992
PCT Pub. Date: Jan. 3, 2014

(65) Prior Publication Data
US 2015/0321221 A1    Nov. 12, 2015

(30) Foreign Application Priority Data
Jun. 28, 2012  (JP) ................................ 2012-145342

(51) Int. Cl.
| B05D 7/00 | (2006.01) |
| C09D 175/04 | (2006.01) |
| C09D 167/02 | (2006.01) |
| C08G 18/66 | (2006.01) |
| C08G 18/75 | (2006.01) |
| C08G 18/08 | (2006.01) |
| C08G 18/42 | (2006.01) |

(52) U.S. Cl.
CPC ......... B05D 7/572 (2013.01); C08G 18/0823 (2013.01); C08G 18/4233 (2013.01); C08G 18/6659 (2013.01); C08G 18/755 (2013.01); C09D 167/02 (2013.01); C09D 175/04 (2013.01); *C08G 2150/90* (2013.01); *Y10T 428/31551* (2015.04)

(58) Field of Classification Search
None
See application file for complete search history.

(56) References Cited

U.S. PATENT DOCUMENTS

| 5,670,600 A | 9/1997 | Nienhaus et al. |
| 2008/0268256 A1 | 10/2008 | Nagano et al. |
| 2010/0255328 A1* | 10/2010 | Tomizaki ............... B05D 7/572 |
| | | 428/483 |
| 2011/0108426 A1* | 5/2011 | Hayashi ................. C09D 5/037 |
| | | 205/50 |
| 2011/0111242 A1 | 5/2011 | Tomizaki et al. |
| 2011/0135935 A1 | 6/2011 | Adachi et al. |
| 2011/0293948 A1* | 12/2011 | Tanaka ................. B05D 3/0254 |
| | | 428/424.2 |

FOREIGN PATENT DOCUMENTS

| DE | 10248799 | 5/2004 |
| JP | 2004-066034 | 3/2004 |
| JP | 4235391 | 3/2009 |
| JP | 4352399 | 10/2009 |
| WO | WO-2009/075389 | 6/2009 |
| WO | 2012002569 A1 | 1/2012 |

OTHER PUBLICATIONS

PCT International Search Report and Written Opinion in PCT/EP2013/060593, mailed Aug. 14, 2013, 11 pages.
PCT International Preliminary Report on Patentability in PCT/EP2013/060593, mailed Jan. 8, 2015, 6 pages.
Jörgen S. Bergstrom, "2—Experimental Characterization Techniques", Excerpt of Mechanics of Solid Polymer, 2015, pp. 103-107.
Notice of Opposition for EP Patent Application No. 13726152.5 and Experimental Report, mailed on Apr. 24, 2017, 22 pages.
Thomas M. Schmitt, "Excerpt of Paint and Coating Testing Manual, Fifteenth Edition of the Gardner Sward Handbook (MNL17-2nd)", ASTM International, Methods for Polymer Molecular Weight Measurement, 2012, pp. 908-913.

* cited by examiner

*Primary Examiner* — Michael P Rodriguez
(74) *Attorney, Agent, or Firm* — Servilla Whitney LLC

(57) ABSTRACT

A method of forming multi-layer paint films comprises forming a first base paint film, wherein an aqueous first base paint (A) is coated over an object; forming a second base paint film wherein a second aqueous base paint (B) is coated over the uncured first base paint film; forming a clear paint film wherein a clear paint (C) is coated over the uncured second based paint film; and heating and curing the first base paint film, the second base paint film, and the clear paint film at the same time and in which the aqueous first base paint (A) includes as the base resin a water-soluble or water-dispersible acrylic resin (A1) and one or more type of water-soluble or water-dispersible resin (A2), selected from among the polyester resins, polyurethane resins and acrylic-urethane resins, both (A1) and (A2) having a weight average molecular weight of from 10,000 to 100,000.

6 Claims, No Drawings

METHOD OF FORMING A MULTI-LAYER PAINT FILM

CROSS-REFERENCE TO RELATED APPLICATIONS

This application is the National Stage entry of PCT/EP2013/060593, filed on May 23, 2013, which claims priority to Japanese Application Number 12/145342, filed on Jun. 28, 2012, which are incorporated herein by reference in their entireties.

TECHNICAL FIELD

The invention concerns a novel method of forming a multi-layer paint film which can be used in various fields and especially in the field of automobile painting.

BACKGROUND TECHNOLOGY

Generally the method of forming a multi-layer paint film where an automobile body is the object being painted is carried out by forming an electrodeposited paint film on the object being painted and heating and curing the film and then forming a multi-layer paint film comprising a mid-coat paint film, a base paint film and a clear paint film. Furthermore, at the present time aqueous paints are being used for the mid-coat paints and base paints in order to cut back on volatile organic solvents (VOC).

Moreover, in recent years the method of forming a multi-layer paint film with the so-called three-coat one-bake (3C1B) system in which an aqueous mid-coat paint is coated over the electrodeposited paint film and a mid-coat paint film is formed, an aqueous base paint is coated over the uncured mid-coat paint film and a base paint film is formed, a clear paint is coated over the uncured base paint film and a clear paint film is formed and these three paint film layers are heated and cured at the same time is starting to be used from the viewpoint of energy conservation.

With the method of multi-layer paint film formation with this 3C1B system the aqueous base paint is coated over the uncured mid-coat paint film with a so-called wet-on-wet system and so there is a problem in that mixing is liable to occur between the mid-coat paint film and the base paint film and the appearance of the paint film decline.

The inclusion of an acrylic emulsion which has a specified weight average molecular weight in an aqueous mid-coat paint has been disclosed in Patent Document 1 as a means of resolving this problem.

Furthermore, the inclusion of an acrylic emulsion which has a specified glass transition temperature, acid value and hydroxyl group value and a urethane resin emulsion which has a specified acid value in an aqueous mid-coat paint has been disclosed in Patent Document 2.

Moreover, the inclusion of an acrylic emulsion in the first aqueous base paint in a method for forming a multi-layer paint film of the 3C1B type in which a first aqueous base paint, a second aqueous base paint and a clear paint are used without using an aqueous mid-coat paint has been disclosed in Patent Document 3.

However, with the methods of forming multi-layer paint films described in Patent Documents 1 to 3 there are problems in that paint films which have a satisfactorily good appearance cannot be obtained and in that sags and bubbles are liable to arise.

PRIOR ART LITERATURE

Patent Documents

Patent Document 1:
Japanese Patent 4235391
Patent Document 2:
Japanese Patent 4352399
Patent Document 3:
Japanese unexamined patent application laid open 2004-066034

OUTLINE OF THE INVENTION

Problems to be Resolved by the Invention

Hence, the present invention provides a 3C1B type method of forming a multi-layer paint film with which multi-layer paint films which have excellent paint film appearance and excellent coating operability (sag resistance, bubbling resistance) can be obtained.

Means of Resolving these Problems

As a result of thorough research carried out with a view to resolving the aforementioned problems, the inventors have discovered that the abovementioned problems can be resolved by using conjointly in the first aqueous base paint a water-soluble or water-dispersible acrylic resin which has a specified weight average molecular weight and one or more type of water-soluble or water-dispersible resin which has a specified weight average molecular weight selected from among the water-soluble or water-dispersible polyester resins, water-soluble or water-dispersible polyurethane resins and water-soluble or water-dispersible acrylic-urethane resins, and the invention is based upon this discovery.

That is to say, the present invention concerns a method of forming a multi-layer paint film which includes a process in which an aqueous first base paint (A) is coated on an object which is to be painted and a first base paint film is formed, a process in which a second aqueous base paint (B) is coated over the aforementioned uncured first base paint film and a second base paint film is formed, a process in which a clear paint (C) is coated over the aforementioned uncured second based paint film and a clear paint film is formed and a process in which the aforementioned first base paint film, the aforementioned second base paint film and the aforementioned clear paint film are heated and cured at the same time, and in which the aforementioned aqueous first base paint (A) includes as the base resin a water-soluble or water-dispersible acrylic resin (A1) of weight average molecular weight from 10,000 to 100,000 and one or more type of water-soluble or water-dispersible resin (A2), selected from among the polyester resins, polyurethane resins and acrylic-urethane resins, which has a weight average molecular weight of from 10,000 to 100,000.

Furthermore, the present invention concerns a method of forming a multi-layer paint film in which, in the method of forming a multi-layer paint film described above, the solid fraction mass ratio represented by {the aforementioned (A1) component/the aforementioned (A2) component} is from 0.1 to 1.0.

Furthermore, the present invention concerns a method of forming a multi-layer paint film in which, in the method of forming a multi-layer paint film described above, the glass transition temperature of the aforementioned (A1) component is from 20 to 80° C.

Furthermore, the present invention concerns a method of forming a multi-layer paint film in which, in the method of forming a multi-layer paint film described above, the glass transition temperature of the aforementioned (A2) component is from −50 to 0° C.

Furthermore, the present invention concerns a method of forming a multi-layer paint film in which, in the method of forming a multi-layer paint film described above, the value of the solid fraction mass ratio represented by {the aforementioned (A1) component+the aforementioned (A2) component}/{the whole of the solid fraction of the base resin of the aforementioned first aqueous base paint (A)} is at least 0.8.

Furthermore, the present invention concerns a method of forming a multi-layer paint film in which, in the method of forming a multi-layer paint film described above, the aforementioned second aqueous base paint (B) includes as base resin a water-soluble or water-dispersible resin of which the weight average molecular weight is from 10,000 to 100,000.

Furthermore, the present invention concerns paint films which have been obtained with the methods of forming a multi-layer paint film described above.

Effect of the Invention

It is possible with the method of forming a multi-layer paint film of this invention to obtain a multi-layer paint film which has excellent paint film appearance and coating operability (sag resistance, bubbling resistance).

EMBODIMENT OF THE INVENTION

The first aqueous base paint (A) includes as base resin a water-soluble or water-dispersible acrylic resin (A1) and one or more type of water-soluble or water-dispersible resin (A2) selected from among the polyester resins, polyurethane resins and acrylic-urethane resins. In this specification the base resin is the resin which has functional groups which react with a crosslinking agent.

The water-soluble or water-dispersible acrylic resin (A1) can be obtained with a known method using a radical polymerization reaction with radically polymerizable monomers as the raw material components.

Examples of the radically polymerizable monomers include (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, sec-butyl (meth)acrylate, hexyl (meth)acrylate, 2-ethylhexyl (meth)acrylate, octyl (meth)acrylate, lauryl (meth)acrylate, stearyl (meth)acrylate, allyl alcohol, 2-hydroxyethyl (meth) acrylate, 3-hydroxypropyl (meth)acrylate, 4-hydroxybutyl (meth)acrylate, styrene, cyclohexyl (meth)acrylate, 4-t-butylcyclohexyl (meth)acrylate, (meth)acrylonitrile and the like. These radically polymerizable monomers can be used individually and combinations of two or more types can also be used.

The weight average molecular weight of the water-soluble or water-dispersible resin (A1) is from 10,000 to 100,000 and, from the viewpoint of coating operability, it is preferably from 10,000 to 80,000 and mode desirably from 15,000 to 40,000. If the weight average molecular weight is less than 10,000 there are cases where sags arise, and if it exceeds 100,000 there are cases where the paint film appearance declines. In more practical terms the weight average molecular weight is, for example, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000 or 100,000, or it may be within the range between any two of the numerical values shown. Moreover, in this specification the value of the weight average molecular weight is the value obtained by means of gel permeation chromatography (GPC) with polystyrene as the standard substance.

The glass transition temperature of the water-soluble or water-dispersible acrylic resin (A1) is, from the viewpoint of the coating operability, preferably from 20 to 80° C., more desirably from 25 to 65° C. and most desirably from 30 to 50° C. The value of the glass transition temperature referred to in this specification is the value of the transition start temperature in DSC (differential scanning calorimetry). In more practical terms the value of the glass transition temperature is, for example, 20, 25, 30, 35, 40, 45, 50, 55, 60, 65, 70, 75 or 80° C., or it may be within the range between any two of the numerical values shown.

No particular limitation is imposed upon the hydroxyl group value of the water-soluble or water-dispersible resin (A1) but, for example, it is preferably from 20 to 120 mgKOH/g.

The water-soluble or water-dispersible resin (A2) is a water-soluble or water-dispersible resin selected from among the water-soluble or water-dispersible polyester resins, water-soluble or water-dispersible polyurethane resins and water-soluble or water-dispersible acrylic-urethane resins, and by using this conjointly with the water-soluble or water-dispersible acrylic resin (A1) it is possible to obtain multi-layer paint films which have an excellent paint film appearance and excellent coating operability (sag resistance, bubbling resistance) with the 3C1B type multi-layer paint film forming method. From the viewpoint of the paint film appearance a water-soluble or water-dispersible polyurethane resin is preferred for the water-soluble or water-dispersible resin (A2).

The weight average molecular weight of the water-soluble or water-dispersible resin (A2) is from 10,000 to 100,000 and, from the viewpoint of coating operability, it is preferably from 10,000 to 60,000 and more desirably from 10,000 to 30,000. If the weight average molecular weight is less than 10,000 there are cases where sags arise, and if it exceeds 100,000 there are cases where the paint film appearance declines. In more practical terms the weight average molecular weight is, for example, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000 or 100,000, or it may be within the range between any two of the numerical values shown.

The glass transition temperature of the water-soluble or water-dispersible acrylic resin (A2) is, from the viewpoint of coating operability, preferably from −50 to 0° C., more desirably from −45 to −10° C. and most desirably from −40 to −25° C. In more practical terms the value of the glass transition temperature is, for example, −50, −45, −40, −35, −30, −25, −20, −15, −10, −5 or 0° C., or it may be within the range between any two of the numerical values shown.

No particular limitation is imposed upon the hydroxyl group value of the water-soluble or water-dispersible resin (A2) but, for example, it is preferably from 20 to 120 mgKOH/g.

The water-soluble or water-dispersible polyester resins which can be used for the water-soluble or water-dispersible resin (A2) can be obtained with a known method using an esterification reaction with polybasic acids and polyhydric alcohols as raw material components.

The usual polycarboxylic acids can be used for the polybasic acids which are components of the water-soluble or water-dispersible polyester resins, and monobasic aliphatic acids can be used conjointly, as required. Examples of the polycarboxylic acids include phthalic acid, isophthalic acid, tetrahydrophthalic acid, tetrahydroisophthalic acid, hexahydrophthalic acid, hexahydroterephthalic acid, trimellitic acid, adipic acid, sebacic acid, succinic acid, azeleic acid, fumaric acid, maleic acid, itaconic acid, pyromellitic acid and the anhydrides of these acids. These polybasic acids can be used individually and combinations of two or more types can also be used.

Glycols and polyhydric alcohols with three or more hydroxyl groups can be cited as polyhydric alcohols which are raw material components of the water-soluble or water-dispersible polyester resins. Actual examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methylpropanediol, cyclohexanedimethanol, 3,3-diethyl-1,5-pentanediol and the like. Furthermore, examples of the polyhydric alcohols which have three or more hydroxyl groups include glycerol, trimethylolethane, trimethylolpropane, pentaerythritol, dipentaerythritol and the like. These polyhydric alcohols can be used individually and combinations of two or more types can also be used.

The water-soluble or water-dispersible polyurethane resins which can be used for the water-soluble or water-dispersible resin (A2) can be obtained with a known method in which polyols, polyisocyanate compounds, dimethylolalkane acids, polyhydric alcohols and the like are used as raw material components.

Polyester polyols, polyether polyols, polycarbonate polyols and the like can be cited as examples of the polyols, but the polyester polyols are preferred.

Polyester polyols can be obtained with a known method using polybasic acids and polyhydric alcohols as raw material components in the same way as the water-soluble and water-dispersible polyester resins.

Examples of the polyisocyanate compounds include aromatic diisocyanates such as 4,4'-diphenylmethane diisocyanate, 2,4- or 2,6-tolylene diisocyanate, 1,5-naphthalene diisocyanate, p- or m-phenylene diisocyanate and the like, alicyclic diisocyanates such as isophorone diisocyanate, 4,4'-dicyclohexylmethane diisocyanate, 1,4-cyclohexylene diisocyanate, hydrogenate of tolylene diisocyanate and the like, aliphatic diisocyanates such as hexamethylene diisocyanate and the like, xylylene diisocyanate, m-tetramethylxylylene diisocyanate and the like. These polyisocyanates can be used individually and combinations of two or more types can also be used.

Examples of the dimethylolalkane acids include dimethylolpropionic acid, dimethylolbutanoic acid, dimethylolpentanoic acid, dimethylolheptanoic acid, dimethyloloctanoic acid, dimethylolnonanoic acid and the like. These dimethylolalkane acids can be used individually and combinations of two or more types can also be used.

Various glycols and polyhydric alcohols which have three or more hydroxyl groups can be cited as polyhydric alcohols and examples include the polyhydric alcohols listed as raw material components of the water-soluble or water-dispersible polyester resins in this specification. These polyhydric alcohols can be used individually and combinations of two or more types can also be used.

The water-soluble or water-dispersible acrylic-urethane resins which can be used for the water-soluble or water-dispersible resin (A2) can be obtained by synthesizing acrylic resins in a water-soluble or water-dispersible polyurethane resin. Here the water-soluble or water-dispersible polyurethane resin has hydrophilic groups and the acrylic resin does not have hydrophilic groups. Consequently the polyurethane resin is used as an emulsifying agent and is located on the outside of the micelles and forms a shell part while the acrylic resin is located on the inside of the micelles and forms a core part, and a core/shell structure is formed.

The water-soluble or water-dispersible polyurethane resin which forms the core part of a water-soluble or water-dispersible acrylic-urethane resin can be obtained with a known method with polyols, polyisocyanate compounds, dimethylolalkane acids, polyhydric alcohols and the like as raw material components.

The acrylic resin which forms the core part of a water-soluble or water-dispersible acrylic-urethane resin can be obtained with a known method using a radical polymerization reaction with radically polymerizable monomers as the raw material components.

The ratio in which the water-soluble or water-dispersible acrylic resin (A1) and water-soluble or water-dispersible resin (A2) are included is, from the viewpoint of coating operability, such that the value of the solid fraction mass ratio represented by {(A1) component/(A2) component} is preferably from 0.1 to 1.0, more desirably from 0.2 to 0.8 and most desirably from 0.3 to 0.5. In more practical terms the value is, for example, 0.1, 0.2, 0.3, 0.4, 0.5, 0.6, 0.7, 0.8, 0.9, 0.95 or 1.0, or it may be within the range between any two of the numerical values shown.

The first aqueous base paint (A) may include known water-soluble or water-dispersible resins together with the water-soluble or water-dispersible resin (A1) and water-soluble or water-dispersible resin (A2) as base resins. In a first aqueous base paint of this invention the value of the solid fraction mass ratio represented by {(A1) component+ (A2) component}/(all of the solid fraction of the base resin of the first aqueous base paint (A)) is preferably at least 0.8, more desirably at least 0.85 and most desirably at least 0.9.

The base resin of the second aqueous base paint (B) is not subject to any particular limitation except that it is a water-soluble or water-dispersible resin, but from the viewpoint of the paint film appearance the weight average molecular weight of the base resin is preferably from 10,000 to 100,000 more desirably from 10,000 to 80,000 and most desirably from 15,000 to 40,000. In more practical terms the weight average molecular weight is, for example, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000 or 100,000, or it may be within the range between any two of the numerical values shown.

Furthermore, the solid fraction mass content proportion of the water-soluble or water-dispersible resin of which the weight average molecular weight is from 10,000 to 100,000 in the second aqueous base paint (B) is, from the viewpoint of the paint film appearance, preferably at least 80 mass %, more desirably at least 85 mass % and most desirably at least 90 mass % with respect to the whole of the solid fraction mass of the base resin of the second aqueous base paint (B).

One or more type of water-soluble or water-dispersible resin selected from among the acrylic resins, polyester resins, polyurethane resins and acrylic-urethane resins for example is preferred for the water-soluble or water-dispersible resin which forms the base resin of the second aqueous base paint (B), the inclusion of at least acrylic resin and polyurethane resin as water-soluble or water-dispersible resins is more desirable and the inclusion of at least acrylic resin, polyurethane resin and polyester resin as water-soluble or water-dispersible resins is more desirable.

The water-soluble or water-dispersible resins which are the base resins of the first aqueous base paint (A) and the second aqueous base paint (B) are preferably used in a state where at least some of the acid groups which are present in the resin have been neutralized with a basic substance. By this means the resins can be present in a stable form in the aqueous paint.

Examples of the basic substances include ammonia, morpholine, N-alkylmorpholine, monoisopropylamine, methylethanolamine, methylisopropanolamine, dimethylethanolamine, diisopropanolamine, diethanolamine, triethanolamine, diethylethanolamine, methylamine, ethylamine, propylamine, butylamine, 2-ethylhexylamine, dimethylamine, diethylamine, dipropylamino, dibutyl-amine, trimethylamine, triethylamine, triisopropyl-amine, tributylamine and the like. One of these basic substances may be used individually and combinations of two or more may be used.

The first aqueous base paint (A) and the second aqueous base paint (B) preferably include a crosslinking agent which reacts with functional groups of the base resins. Examples of these crosslinking agents include amino resins, polyisocyanate compounds, blocked polyisocyanate compounds and the like. One of these crosslinking agents may be used individually and combinations of two or more types may be used.

Amino resin is the general name of resins where formaldehyde has been added to a compound which includes amino groups and condensed, and in more practical terms examples include melamine resins, urea resins, guanamine resins and the like. From among these the melamine resins are preferred.

Examples of the melamine resins include partially or fully methylolated melamine resins obtained by reacting melamine and formaldehyde, partially of fully alkyl etherified type melamine resins obtained by partially or fully etherifying the methylol groups of a methylolated melamine resin with an alcohol component, and melamine resins which are mixtures of these types. Here examples of the alkyl etherified type melamine resins include methylated melamine resins, butylated melamine resins, methyl/butyl mixed alkyl type melamine resins and the like.

In those cases where a melamine resin is used as the crosslinking agent the solid fraction mass ratio represented by {(base resin)/(amino resin)} is, from the viewpoints of water resistance and chipping resistance, preferably from 1.5 to 6.0 and more desirably from 1.75 to 4.0.

Examples of the polyisocyanate compounds include aromatic diisocyanates such as 4,4'-diphenylmethane diisocyanate, 2,4- or 2,6-tolylene diisocyanate, 1,5-naphthalene diisocyanate, p- or m-phenylene diisocyanate and the like, alicyclic diisocyanates such as isophorone diisocyanate, 4,4'-dicyclohexylmethane diisocyanate, 1,4-cyclohexylene diisocyanate, hydrogenated tolylene diisocyanate and the like, aliphatic diisocyanates such as hexamethylene diisocyanate and the like, xylylene diisocyanate, m-tetramethyl-xylylene diisocyanate and the like.

The blocked polyisocyanate compounds are compounds where the isocyanate groups of a polyisocyanate compound have been protected with a blocking agent. Examples of the blocking agents include alcohols such as butanol, oximes such as methyl ethyl ketone oxime, lactams such as ε-caprolactam, diketones such as acetoacetic acid diesters, imidazoles such as imidazole, 2-ethylimidazole and the like, and phenols such as m-cresol and the like.

In those cases where polyisocyanate compounds or blocked polyisocyanate compounds are used as crosslinking agents the equivalent ratio (NCO/OH) of crosslinking agent isocyanate groups with respect to base resin hydroxyl groups is, from the viewpoint of the water resistance, chipping resistance and the like, preferably from 0.5 to 2.0 and more desirably from 0.8 to 1.5.

Various pigments such as coloring pigments, glitter pigments, true pigments and the like can be included in the first aqueous base paint (A) and second aqueous base paint (B). Examples of the coloring pigments include inorganic pigments such as chrome yellow, yellow iron oxide, iron oxide, carbon black, titanium dioxide and the like and organic pigments such as azochelate-based pigments, insoluble azo-based pigments, condensed azo-based pigments, phthalocyanine-based pigments, indigo pigments, perinone-based pigments, perylene-based pigments, dioxane-based pigments, quinacridone-based pigments, isoindolinone-based pigments, metal complex pigments and the like. Furthermore, the glitter pigments include aluminum flake pigments, alumina flake pigments, mica pigments, silica flake pigments, glass flake pigments and the like. Moreover examples of the true pigments include calcium carbonate, baryta, precipitated barium sulfate, clay, talc and the like. One of these pigments may be used individually and combinations of two or more types may be used.

In those cases where pigments are included in the first aqueous paint (A) and the second aqueous paint (B) the mass ratio of pigment and the whole of the solid fraction of the base resin (pigment/base resin) is, for example, preferably from 0.03 to 2.0.

One or more of various additives such as surface controlling agents, anti-foaming agents, surfactants, film-forming promoters, antifungal agents, ultraviolet absorbers, light-stabilizers, antioxidants and the like, various rheology-controlling agents and various organic solvents can be included in the first aqueous base paint (A) and second aqueous base paint (B).

The first aqueous base paint (A) and second aqueous base paint (B) are supplied for coating after being diluted to an appropriate viscosity using water and, depending on the particular case, small amounts of organic solvents and amines.

No particular limitation is imposed upon the clear paint in the method of forming a multi-layer paint film of this invention. The base resins of the clear paints include acrylic resins, polyester resins, alkyd resins and the like, and examples of the curing systems include melamine curing, acid/epoxy curing, isocyanate curing and the like. From among these the clear paints of the acid/epoxy curing type which have acrylic resin as the base resin are preferred from the viewpoints of weather resistance and acid resistance.

The methods generally used in the automobile industry, for example air spray coating, air atomization type electrostatic coating, bell rotation atomization type electrostatic coating and the like can be used as the method of coating each of the paints in the method of forming a multi-layer paint film of this invention.

First of all in the method of forming a multi-layer paint film of this invention the first aqueous base paint (A) is coated on the object which is to be painted.

The object which is to be painted may be a metal material with an electrodeposited paint film formed on the surface, a metal material on which a mid-coat paint film has been formed over an electrodeposited paint film, a plastic or such like material.

No particular limitation is imposed upon the temperature and humidity conditions when coating the first aqueous base paint (A) and, for example, the conditions are from 10 to 40° C. and from 65 to 85% (relative humidity). Furthermore, the dry film thickness of the first base paint film when the first aqueous base paint (A) is coated is, for example, from 10 to 40 μm and, from the viewpoints of weather resistance and chipping resistance, it is preferably from 15 to 40 μm.

Preliminary drying may be carried out after coating the first aqueous base paint (A) in the method of forming a multi-layer paint film of this invention. Moreover, the conditions in those cases where preliminary drying is carried out are preferably from 30 to 100° C. and from 3 to 10 minutes.

The second aqueous base paint (B) is coated over the uncured first base paint film in the method of forming a multi-layer film of this invention.

No particular limitation is imposed upon the temperature and humidity conditions when coating the second aqueous base paint (B) and, for example, the conditions are from 10 to 40° C. and from 65 to 85% (relative humidity). Furthermore, the dry film thickness of the second base paint film when the second aqueous base paint (B) is coated is, for example, from 5 to 15 μm.

Preliminary drying may be carried out after coating the second aqueous base paint (B) in the method of forming a multi-layer paint film of this invention. Moreover, the conditions in those cases where preliminary drying is carried out are preferably from 30 to 100° C. and from 3 to 10 minutes.

The clear paint (C) is coated over the second base paint film in the method of forming a multi-layer paint film of this invention.

No particular limitation is imposed upon the dry film thickness of the clear paint film when the clear paint (C) is coated but it is, for example, preferably from 20 to 100 μm.

In the method of forming a multi-layer paint film of this invention the first base paint film, second base paint film and clear paint film which have been formed with the method outlined above are heated and cured at the same time.

The heating and curing temperature and time in the heating and curing process of the method of forming a multi-layer paint film of this invention are, for example, preferably from 120 to 170° C. and from 10 to 60 minutes.

ILLUSTRATIVE EXAMPLES

The invention is described in more detail below by means of illustrative examples, but the invention is not limited by these examples. Moreover, in the absence of any indication to the contrary, the terms "parts", "%" and "ratio" in the examples indicate "parts by mass", "mass %" and "mass ratio" respectively.

Example of Production 1-1: Production of Water-Dispersible Acrylic Resin AC-1

Deionized water (40 parts) was introduced into a flask which had been furnished with a reflux condenser, a thermometer, stirring apparatus, a nitrogen gas delivery tube and a dropping funnel and the temperature was raised to 80° C. Next a radically polymerizable monomer mixture, comprising 15 parts of methyl methacrylate, 10 parts of styrene, 37 parts of n-butyl methacrylate, 18.5 parts of 2-hydroxyethyl methacrylate, 9.2 parts of butyl acrylate and 10.3 parts of acrylic acid, 4.0 parts of emulsion polymerization controlling agent (trade name Thiokalcol 20, produced by the Kao Co., n-dodecyl mercaptan), an emulsifying agent solution comprising 2.0 parts of reactive anionic emulsifying agent (trade name Eleminol RS-30, produced by the Sanyo Kasei Kogyo Co., methacryloyloxy polyoxyalkylene sulfate ester sodium), 1.0 part of reactive nonionic emulsifying agent (trade name Adeka Reasop NE20, produced by the Adeka Co.) and 15 parts of deionized water, and a polymerization initiator solution comprising 0.32 part of ammonium persulfate and 15 parts of deionized water as a drip-feed component were added dropwise over a period of 3 hours with the dropping funnel. After the drip-feed had been completed the stirring was continued for 1 hour and then the mixture was cooled to 40° C. and the water-dispersible acrylic resin AC-1 which had the property values shown in Table 1 was obtained.

Examples of Production 1-2 to 1-8: Production of Water-Dispersible Acrylic Resins AC-2 to AC-8

The water-dispersible acrylic resins AC-2 to AC-8 which had the property values shown in Table 1 were prepared with the same method as in Example of Production 1-1 in accordance with the compounding compositions shown in Table 1.

TABLE 1

| | Water-dispersible Acrylic Resin | AC-1 | AC-2 | AC-3 | AC-4 | AC-5 | AC-6 | AC-7 | AC-8 |
|---|---|---|---|---|---|---|---|---|---|
| Reaction Solvent | Deionized Water | 40 | 40 | 40 | 40 | 40 | 40 | 40 | 40 |
| Drip-Feed Component | Methyl Methacrylate | 15.0 | 15.0 | 15.0 | 15.0 | 45.0 | 15.0 | 15.0 | 15.0 |
| | Styrene | 10.0 | 10.0 | 10.0 | 10.0 | 10.0 | 10.0 | 10.0 | 10.0 |
| | n-Butyl Methacrylate | 37.0 | 37.0 | 22.0 | 37.0 | 15.0 | 37.0 | 37.0 | 37.0 |
| | 2-Hydroxyethyl Methacrylate | 18.5 | 18.5 | 18.5 | 18.5 | 18.5 | 18.5 | 18.5 | 18.5 |
| | Butyl Acrylate | 9.2 | 9.2 | 24.2 | 9.2 | 2.3 | 9.2 | 9.2 | 9.2 |
| | Acrylic Acid | 10.3 | 10.3 | 10.3 | 10.3 | 9.2 | 10.3 | 10.3 | 10.3 |
| | Emulsion Polymerization Controlling Agent (Note 1) | 4.0 | 3.0 | 2.0 | 2.0 | 2.0 | 1.0 | | 6.0 |
| | Reactive Anionic Emulsifying Agent (Note 2) | 2.0 | 2.0 | 2.0 | 2.0 | 2.0 | 2.0 | 2.0 | 2.0 |
| | Reactive Nonionic Emulsifying Agent (Note 3) | 1.0 | 1.0 | 1.0 | 1.0 | 1.0 | 1.0 | 1.0 | 1.0 |
| | Deionized Water | 15 | 15 | 15 | 15 | 15 | 15 | 15 | 15 |
| | Ammonium Persulfate | 0.32 | 0.32 | 0.30 | 0.30 | 0.30 | 0.28 | 0.26 | 0.34 |
| | Deionized Water | 15 | 15 | 15 | 15 | 15 | 15 | 15 | 15 |

TABLE 1-continued

| Water-dispersible Acrylic Resin | | AC-1 | AC-2 | AC-3 | AC-4 | AC-5 | AC-6 | AC-7 | AC-8 |
|---|---|---|---|---|---|---|---|---|---|
| Property Values | Weight Average Molecular Weight Mw | 20,000 | 35,000 | 50,000 | 50,000 | 50,000 | 90,000 | 200,000 | 5,000 |
| | Glass Transition Temperature Tg (° C.) | 41 | 41 | 25 | 41 | 75 | 41 | 41 | 41 |
| | Acid Value (mgKOH/g) | 80 | 80 | 80 | 80 | 60 | 80 | 80 | 80 |
| | Hydroxyl Group Value (mgKOH/g) | 80 | 80 | 80 | 80 | 80 | 80 | 80 | 80 |
| | Resin Solid Fraction | 44.5% | 44.5% | 44.5% | 44.5% | 44.5% | 44.5% | 44.5% | 44.5% |

Details of each of the compounded components shown in Table 1 are indicated below.
(Note 1) Emulsion Polymerization Controlling Agent (trade name Thiokalcol 20, produced by the Kao Co., n-dodecyl mercaptan)
(Note 2) Reactive Anionic Emulsifying Agent (trade name Eleminol RS-30, produced by the Sanyo Kasei Kogyo Co., methacryloyloxy polyoxyalkylene sulfate ester sodium)
(Note 3) Reactive Nonionic Emulsifying Agent (trade name Adeka Reasorp NE20, produced by the Adeka Co.)

Example of Production 2-1: Production of Water-Dispersible Polyurethane Resin PU-1

Example of Production 2-1(a): Polyesterpolyol Production

Dimer acid (trade name Empol 1008, produced by the Cognis Co., carbon number 36, 54.0 parts), 8.0 parts of neopentyl glycol, 17.8 parts of isophthalic acid, 19.4 parts of 1,6-hexanediol and 0.8 part of trimethylolpropane were introduced into a flask which had been furnished with a reflux condenser fitted with a separating tube for the reaction water, a thermometer, stirring apparatus and a nitrogen gas delivery tube, the temperature was raised to 120° C. and, after dissolution of the raw material, the temperature was raised to 160° C., with stirring. After being maintained at 160° C. for 1 hour the temperature was raised to 230° C. over a period of 5 hours. The acid value was measured periodically while the temperature was being maintained at 230° C. and when the resin acid value reached 4 mgKOH/g the temperature was lowered to 80° C. Finally 31.6 parts of methyl ethyl ketone were added and a polyester polyol of acid value 4 mgKOH/g, hydroxyl group value 62 mgKOH/g and weight average molecular weight 7,200 g was obtained.

Example of Production 2-1(b): Production of Water-Dispersible Polyurethane Resin PU-1

The polyester polyol obtained in Example of Production 2-1(a) (81.5 parts), 6.1 parts of dimethylolpropionic acid, 1.4 parts of neopentyl glycol and 30 parts of methyl ethyl ketone were introduced into a flask which had been furnished with a thermometer, a stirrer and a nitrogen gas delivery tube and the temperature was raised to 80° C., with stirring. On reaching 80° C., 25.9 parts of isophorone diisocyanate were added, the temperature was maintained at 80° C. and, when the isocyanate value reached 0.51 meq/g (shown as Isocyanate Value (1) in Table 2), 5.8 parts of trimethylolpropane were added and the temperature was maintained at 80° C. When the isocyanate value (shown as Isocyanate Value (2) in Table 2) reached 0.01 meq/g 33.3 parts of butyl cellosolve were added and then the temperature was raised to 100° C. and the methyl ethyl ketone was removed under reduced pressure conditions. Finally, after lowering the temperature to 50° C., 3.6 parts of dimethylethanolamine were added and the acid groups were neutralized, 196.0 parts of deionized water were added and the polyurethane resin PU-1 which had the property values shown in Table 2 was obtained.

Examples of Production 2-2 to 2-4: Production of Water-Dispersible Polyurethane Resins PU-2 to PU-4

The water-dispersible polyurethane resins PU-2 to PU-4 which had the property values shown in Table 2 were obtained using the same method as in Example of Production 2-1(b) in accordance with the compounding compositions and conditions shown in Table 2. Moreover, neopentyl glycol was used instead of the trimethylolpropane used in Example of Production 2-1(b) when producing the water-dispersible resin PU-4.

TABLE 2

| Water-dispersible Polyurethane Resin | PU-1 | PU-2 | PU-3 | PU-4 |
|---|---|---|---|---|
| Polyester polyol (PU) | 81.5 | 83 | 83.2 | 63.1 |
| Dimethylolpropionic Acid | 6.1 | 6.2 | 6.3 | 5.6 |
| Neopentyl Glycol | 1.4 | 1.4 | 1.4 | 1.3 |
| Methyl Ethyl Ketone | 30.0 | 70.0 | 70.0 | 20.0 |
| Isophorone Diisocyanate | 25.9 | 26.4 | 26.5 | 32.4 |
| Isocyanate Value (1) (meq/g) | 0.51 | 0.51 | 0.51 | 1.52 |
| Trimethylolpropane | 5.8 | 4.1 | 3.7 | |
| Neopentyl Glycol | | | | 13.6 |
| Isocyanate Value (2) (meq/g) | 0.01 | 0.01 | 0.01 | 0.01 |
| Butyl Cellosolve | 33.3 | 66.7 | 66.7 | 33.3 |
| Dimethylethanolamine | 3.6 | 3.60 | 3.6 | 3.20 |
| Deionized Water | 196 | 230 | 230 | 149.2 |
| Weight Average Molecular Weight | 24,500 | 80,000 | 120,000 | 8,000 |
| Glass Transition Temperature (° C.) | −35 | −35 | −35 | −30 |

TABLE 2-continued

| Water-dispersible Polyurethane Resin | PU-1 | PU-2 | PU-3 | PU-4 |
|---|---|---|---|---|
| Acid Value (mgKOH/g) | 28 | 29 | 29 | 25 |
| Hydroxyl Group Value (mgKOH/g) | 46 | 24 | 20 | 74 |
| Resin Solid Fraction | 30% | 25% | 25% | 35% |

Example of Production 3: Production of Water-Dispersible Acrylic-Urethane Resin AU Example of Production 3(a): Polyesterpolyol Production Dimer acid (trade name Empol 1008, produced by the Cognis Co., carbon number 36, 54.0 parts), 8.0 parts of neopentyl glycol, 17.8 parts of isophthalic acid, 19.4 parts of 1,6-hexanediol and 0.8 part of trimethylolpropane were introduced into a flask which had been furnished with a reflux condenser fitted with a separating tube for the reaction water, a thermometer, stirring apparatus and a nitrogen gas delivery tube, the temperature was raised to 120° C. and, after dissolution of the raw material, the temperature was raised to 160° C., with stirring. After being maintained at 160° C. for 1 hour the temperature was raised to 230° C. over a period of 5 hours. The reaction was continued at 230° C. and, when the resin acid value reached 4 mgKOH/g, the temperature was lowered to 80° C. Finally 31.6 parts of methyl ethyl ketone were added and a polyester polyol of acid value 4 mgKOH/g, hydroxyl group value 62 mgKOH/g and weight average molecular weight 7,200 g was obtained.

Example of Production 3(b): Polyurethane Resin Production

The polyester polyol obtained in Example of Production 3(a) (78.3 parts), 7.8 parts of dimethylolpropionic acid, 1.4 parts of neopentyl glycol and 14.8 parts of methyl ethyl ketone were introduced into a flask which had been furnished with a thermometer, a stirrer and a nitrogen gas delivery tube and the temperature was raised to 80° C., with stirring. On reaching 80° C., 27.6 parts of isophorone diisocyanate were added, the temperature was maintained at 80° C. and, when the isocyanate value reached 0.43 meq/g, 4.8 parts of trimethylolpropane were added and the temperature was maintained at 80° C. When the isocyanate value reached 0.01 meq/g 33.3 parts of butyl cellosolve were added and then the temperature was raised to 100° C. and the methyl ethyl ketone was removed under reduced pressure conditions. Finally, after lowering the temperature to 50° C., 4.4 parts of dimethylethanolamine were added and the acid groups were neutralized, 124.6 parts of deionized water were added and, as a result, a polyurethane resin of resin solid fraction 35%, acid value 35 mgKOH/g, hydroxyl group value 40 mgKOH/g and weight average molecular weight 24,500 was obtained.

Example of Production 3(c): Production of Water-Dispersible Acrylic-Urethane Resin AU The polyurethane Resin obtained in Example of Production 3(b) (71.5 parts) and 19.3 parts of deionized water were introduced into a flask which had been furnished with a thermometer, stirring apparatus and a nitrogen gas delivery tube and, after raising the temperature to 85° C., with stirring, a homogeneous liquid mixture of 2.2 parts of styrene, 2.1 parts of methyl methacrylate, 1.8 parts of n-butyl acrylate, 1.4 parts of 2-hydroxyethyl methacrylate, 1.5 parts of propylene glycol mono-methyl ether and 0.1 part of t-butylperoxy-2-ethyl-ethylhexanoate which is a polymerization initiator as a drip-feed component was added dropwise at a constant rate over a period of 3.5 hours using a dropping funnel. After the drip-feed had been completed the temperature was maintained at 85° C. for 1 hour and then a polymerization initiator solution where 0.03 part of t-butylperoxy-2-ethyl-ethylhexanoate which is a polymerization initiator had been dissolved in 0.09 part of propylene glycol mono-ethyl ether was added as supplementary catalyst, the temperature was maintained at 85° C. for 1 hour and the water-dispersible acrylic-urethane resin AU was obtained. The property values of the water-dispersible acrylic-urethane resin AU were weight average molecular weight 80,000, glass transition temperature −20° C., acid value 27 mgKOH/g, hydroxyl group value 49 mgKOH/g and resin solid fraction 32.5%.

Example of Production 4: Production of Water-Dispersible Polyester Resin PE

Dimer acid (trade name Empol 1008, produced by the Cognis Co., carbon number 36, 15.0 parts), 30.0 parts of phthalic acid anhydride, 3.1 part of adipic acid, 31.5 parts of 1,6-hexanediol and 10.3 parts of trimethylolpropane were introduced into a flask which had been furnished with a reflux condenser fitted with a separating tube for the reaction water, a thermometer, stirring apparatus and a nitrogen gas delivery tube, the temperature was raised to 120° C. and, after dissolution of the raw material, the temperature was raised to 160° C., with stirring. After being maintained at 160° C. for 1 hour the temperature was raised to 230° C. over a period of 5 hours. After being maintained at 230° C. for 2 hours the temperature was lowered to 180° C. Trimellitic acid anhydride (10 parts) was added and the acid value was measured periodically while the temperature was being maintained at 180° C. and the temperature was lowered to 80° C. or below when the acid value reached 25 mgKOH/g. Butyl cellosolve (25 parts) was added and then 3.2 parts of dimethylethanolamine were added and the acid groups were neutralized, 34.1 parts of deionized water were added and the water-dispersible polyester resin PE was obtained. The property values of the water-dispersible polyester resin PE were weight average molecular weight 15,000, glass transition temperature −30° C., acid value 25 mgKOH/g, hydroxyl group value 90 mgKOH/g and resin solid fraction 60%.

Example 1

A first aqueous base paint and a second aqueous base paint were produced in accordance with the method outlined below, a multi-layer paint film was formed using these paints and its properties were evaluated.
Production of the First Aqueous Base Paint
Using the aqueous polyurethane resin PU-1 as a dispersing resin, 1 part of carbon black (trade name MA-100, produced by the Mitsubishi Kagaku Co.) and 99 parts of titanium dioxide (trade name Ti-Pure, produced by the DuPont Co.) were dispersed in a mortar mill to prepare a pigment paste. Next the water-dispersible acrylic resin AC-1 (39.3 parts) and the water-dispersible polyurethane resin PU-1 where mixed together in a dissolver and then the aforementioned pigment paste was added and admixed. Finally 33.3 parts of melamine resin (trade name Cymel 327, produced by the Cytec Industries Co.) were added and admixed and the first aqueous base paint was obtained. Here the aqueous polyurethane resin PU-1 content of the first aqueous base paint was set to 175.0 parts.

Production of the Second Aqueous Base Paint

Using the aqueous polyurethane resin PU-1 as a dispersing resin, 5 parts of carbon black (trade name FW 200, produced by the Ebonik Degussa Japan Co.) were dispersed in a mortar mill to prepare a pigment paste. Next 39.3 parts of the water-dispersible acrylic resin AC-1 and the water-dispersible polyurethane resin PU-1 were mixed together in a dissolver and then the aforementioned pigment paste was added and admixed. Finally 33.3 parts of melamine resin (trade name Cymel 327, produced by the Cytec Industries Co.) were added and admixed and the second aqueous base paint was obtained. Here the aqueous polyurethane resin PU-1 content of the second aqueous base paint was set to 175.0 parts.

Paint Film Performance Evaluation

A cationic electro-deposition paint (trade name Catho-Guard No. 500, produced by the BASF Coatings Co. Ltd.) was electro-deposition coated on a zinc phosphate treated mild steel sheet in such a way as to provide dry film thickness of 20 μm and baked for 25 minutes at 175° C. to form an electrodeposited paint filmed sheet for evaluation purposes (referred to hereinafter as an electrodeposited sheet).

The first aqueous base paint and second aqueous base paint which had been produced were diluted with deionized water and set to a viscosity of 40 seconds (Ford Cup #4, 20° C.). Furthermore, a rotation atomization type bell painting machine (trade name Metallic Bell G1-COPES Bell, produced by the ABB Co.) was prepared and multi-layer paint film formation was carried out with the method outlined below with the coating conditions set to 25° C. and 75% (relative humidity).

The first aqueous base paint was coated onto the electrodeposited sheet in such a way that the dry film thickness was 20 μm. After this the sheet was left to stand for 5 minutes at room temperature and then the second aqueous base paint was coated in such a way that the dry film thickness was 12 μm. After coating, the sheet was left to stand for 5 minutes at room temperature and the preliminary heating was carried out at 80° C. for 3 minutes. After cooling down to room temperature a clear paint (Belcoat No. 7300, produced by the BASF Coatings Japan Co. Ltd.) was coated in such a way that the dry film thickness was 30 μm. After coating, the sheet was left to stand for 10 minutes at room temperature, baked at 140° C. for 30 minutes and a test piece was obtained.

(1) Paint Film Appearance

The paint film appearance of the test piece was evaluated on the basis of the following criteria using the Sw value obtained on measuring the smoothness of the paint film surface with a Wavescan DOI (trade name, produced by the BYK Gardner Co.)

◉: Sw value less than 10
○: Sw value at least 10 but less than 15
Δ: Sw value at least 15 but less than 20
X: Sw value 20 or above (2) Coating Operability (Bubbling Resistance, Sag Resistance)

Fourteen punched holes of diameter 1 cm were arranged with a spacing of 3 cm along the long side and in the part up to 3 cm from the edge in the short side direction of an electrodeposited sheet measuring 15 cm×45 cm to form a test object for painting. This test object for painting was set on a coating table in such a way that it was perpendicular to the ground surface and with the punched holes parallel to the ground surface and a coating operability test piece was prepared with the method outlined below.

The first aqueous base paint was gradient-coated on the test object for painting in such a way that the dry film thickness increased gradually from 10 μm to 40 μm along the long side direction of the test object for painting. After coating, the sheet was left to stand for 5 minutes at room temperature and the second aqueous base paint was coated in such a way that the dry film thickness was 12 μm. After coating, the sheet was left to stand for 5 minutes at room temperature and then preliminary heating was carried out at 80° C. for 3 minutes. After cooling down to room temperature a clear paint (Belcoat No. 7300, produced by the BASF Coatings Japan Co. Ltd.) was coated in such a way that the dry film thickness was 30 μm. After coating, the sheet was left to stand for 10 minutes at room temperature, baked at 140° C. for 30 minutes and a coating operability test piece was obtained.

(2-1) Bubbling Resistance

The coating operability test piece was observed visually and the dry film thickness immediately before bubbling started to occur with respect to the increase in dry film thickness of the first aqueous base paint was measured with a film thickness gauge (trade name Elcometer 456, produced by the Elcometer Co.) and an evaluation was made on the basis of the following criteria:

◉: 35 μm or above
○: At least 30 μm and less than 35 μm
Δ: At least 25 μm and less than 30 μm
X: Less than 25 μm (2-2) Sag Resistance The coating operability test piece was observed visually and the dry film thickness immediately before where the distance to the end point of the sag from the bottom edge of the punched hole reached 5 mm with respect to the increase in dry film thickness of the first aqueous base paint was measured with a film thickness gauge (trade name Elcometer 456, produced by the Elcometer Co.) and an evaluation was made on the basis of the following criteria:

◉: 35 μm or above
○: At least 30 μm and less than 35 μm
Δ: At least 25 μm and less than 30 μm
X: Less than 25 μm The results of the abovementioned evaluations are shown in Table 3.

Examples 2 to 15 and Comparative Examples 1 to 6

Test pieces were prepared and paint film performance evaluations were carried out with the same methods as in Example 1 using the first aqueous base paints and second aqueous base paints shown in Tables 2 and 3. The evaluation results are shown in Tables 3 and 4.

TABLE 3

| | | | Mw | Tg °C. | Resin Solid Fract. | Example 1 | 2 | 3 | 4 | 5 | 6 | 7 | 8 |
|---|---|---|---|---|---|---|---|---|---|---|---|---|---|
| First Aqueous Base Paint | (A1) | AC-1 | 20,000 | 41 | 44.5% | 39.3 | 39.3 | 39.3 | 39.3 | 39.3 | 39.3 | | |
| | | AC-2 | 35,000 | 41 | 44.5% | | | | | | | 39.3 | |
| | | AC-3 | 50,000 | 25 | 44.5% | | | | | | | | 39.3 |
| | | AC-4 | 50,000 | 41 | 44.5% | | | | | | | | |
| | | AC-5 | 50,000 | 75 | 44.5% | | | | | | | | |
| | | AC-6 | 90,000 | 41 | 44.5% | | | | | | | | |
| | (A2) | PU-1 | 24,500 | −35 | 30.0% | 175.0 | 175.0 | | | | | 175.0 | 175.0 |
| | | PU-2 | 80,000 | −35 | 25.0% | | | 210.0 | | | | | |
| | | PE | 15,000 | −30 | 60.0% | | | | 87.5 | 87.5 | | | |
| | | AU | 80,000 | −20 | 32.5% | | | | | | 161.5 | | |
| | (Mel) | Melamine Resin (Note 1) | | | 90% | 33.3 | 33.3 | 33.3 | 33.3 | 33.3 | 33.3 | 33.3 | 33.3 |
| | | Carbon Black (Note 2) | | | | 1.0 | 1.0 | 1.0 | 1.0 | 1.0 | 1.0 | 1.0 | 1.0 |
| | | Titanium Dioxide (Note 3) | | | | 99.0 | 99.0 | 99.0 | 99.0 | 99.0 | 99.0 | 99.0 | 99.0 |
| | | TOTAL | | | | 347.7 | 347.7 | 382.7 | 260.2 | 260.2 | 334.2 | 347.7 | 347.7 |
| | | (A1)/(A2) SFMR[*1] | | | | 0.33 | 0.33 | 0.33 | 0.33 | 0.33 | 0.33 | 0.33 | 0.33 |
| | | {(A1) + (A2)}/(Base Resin) SFMR[1] | | | | 1.0 | 1.0 | 1.0 | 1.0 | 1.0 | 1.0 | 1.0 | 1.0 |
| | | {(A1) + (A2)}/Mel SFMR[*1] | | | | 2.33 | 2.33 | 2.33 | 2.33 | 2.33 | 2.33 | 2.33 | 2.33 |
| | | (Pigment)/(Resin) SFMR[*1] | | | | 1.0 | 1.0 | 1.0 | 1.0 | 1.0 | 1.0 | 1.0 | 1.0 |
| 2nd Aqu. Base Paint | (A1) | AC-1 | 20,000 | 41 | 44.5% | 39.3 | | 39.3 | 39.3 | | 39.3 | 39.3 | 39.3 |
| | | AC-2 | 35,000 | 41 | 44.5% | | 39.3 | | | 39.3 | | | |
| | (A2) | PU-1 | 24,500 | −35 | 30.0% | 175.0 | 175.0 | 175.0 | 175.0 | 175.0 | 175.0 | 175.0 | 175.0 |
| | (Mel) | Melamine Resin (Note 1) | | | 90.0% | 33.3 | 33.3 | 33.3 | 33.3 | 33.3 | 33.3 | 33.3 | 33.3 |
| | | Carbon Black (Note 2) | | | | 5.0 | 5.0 | 5.0 | 5.0 | 5.0 | 5.0 | 5.0 | 5.0 |
| | | TOTAL | | | | 252.7 | 252.7 | 252.7 | 252.7 | 252.7 | 252.7 | 252.7 | 252.7 |
| | | (A1)/(A2) SFMR[*1] | | | | 0.33 | 0.33 | 0.33 | 0.33 | 0.33 | 0.33 | 0.33 | 0.33 |
| | | {(A1) + (A2)}/(Base Resin) SFMR[1] | | | | 1.0 | 1.0 | 1.0 | 1.0 | 1.0 | 1.0 | 1.0 | 1.0 |
| | | {(A1) + (A2)}/Mel SFMR[*1] | | | | 2.33 | 2.33 | 2.33 | 2.33 | 2.33 | 2.33 | 2.33 | 2.33 |
| | | (Pigment)/(Resin SFMR[*1] | | | | 0.05 | 0.05 | 0.05 | 0.05 | 0.05 | 0.05 | 0.05 | 0.05 |
| Evaluation | | Paint film appearance | | | | ⊚ | ⊚ | ○ | ⊚ | ⊚ | ○ | ⊚ | ○ |
| | | Bubbling Resistance | | | | ⊚ | ⊚ | ⊚ | ⊚ | ⊚ | ○ | ⊚ | ⊚ |
| | | Sag Resistance | | | | ⊚ | ⊚ | ⊚ | ⊚ | ⊚ | ⊚ | ⊚ | ○ |

| | | | Mw | Tg °C. | Resin Solid Fract. | Example 9 | 10 | 11 | 12 | 13 | 14 | 15 |
|---|---|---|---|---|---|---|---|---|---|---|---|---|
| First Aqueous Base Paint | (A1) | AC-1 | 20,000 | 41 | 44.5% | | | | 18.9 | 75.5 | | 55.1 |
| | | AC-2 | 35,000 | 41 | 44.5% | | | | | | | |
| | | AC-3 | 50,000 | 25 | 44.5% | | | | | | | |
| | | AC-4 | 50,000 | 41 | 44.5% | 39.3 | | | | | | |
| | | AC-5 | 50,000 | 75 | 44.5% | | 39.3 | | | | | |
| | | AC-6 | 90,000 | 41 | 44.5% | | | 39.3 | | | 39.3 | |
| | (A2) | PU-1 | 24,500 | −35 | 30.0% | 175.0 | 175.0 | 175.0 | 205.3 | 121.3 | | 151.7 |
| | | PU-2 | 80,000 | −35 | 25.0% | | | | | | | |
| | | PE | 15,000 | −30 | 60.0% | | | | | | | |
| | | AU | 80,000 | −20 | 32.5% | | | | | | 161.5 | |
| | (Mel) | Melamine Resin (Note 1) | | | 90% | 33.3 | 33.3 | 33.3 | 33.3 | 33.3 | 33.3 | 33.3 |
| | | Carbon Black (Note 2) | | | | 1.0 | 1.0 | 1.0 | 1.0 | 1.0 | 1.0 | 1.0 |
| | | Titanium Dioxide (Note 3) | | | | 99.0 | 99.0 | 99.0 | 99.0 | 99.0 | 99.0 | 99.0 |
| | | TOTAL | | | | 347.7 | 347.7 | 347.7 | 357.5 | 330.2 | 334.2 | 340.1 |
| | | (A1)/(A2) SFMR[*1] | | | | 0.33 | 0.33 | 0.33 | 0.14 | 0.92 | 0.33 | 0.54 |
| | | {(A1) + (A2)}/(Base Resin) SFMR[1] | | | | 1.0 | 1.0 | 1.0 | 1.0 | 1.0 | 1.0 | 1.0 |
| | | {(A1) + (A2)}/Mel SFMR[*1] | | | | 2.33 | 2.33 | 2.33 | 2.33 | 2.33 | 2.33 | 2.33 |
| | | (Pigment)/(Resin)SFMR[*1] | | | | 1.0 | 1.0 | 1.0 | 1.0 | 1.0 | 1.0 | 1.0 |
| 2nd Aqu. Base Paint | (A1) | AC-1 | 20,000 | 41 | 44.5% | 39.3 | 39.3 | 39.3 | 39.3 | 39.3 | 39.3 | 39.3 |
| | | AC-2 | 35,000 | 41 | 44.5% | | | | | | | |
| | (A2) | PU-1 | 24,500 | −35 | 30.0% | 175.0 | 175.0 | 175.0 | 175.0 | 175.0 | 175.0 | 175.0 |
| | (Mel) | Melamine Resin (Note 1) | | | 90.0% | 33.3 | 33.3 | 33.3 | 33.3 | 33.3 | 33.3 | 33.3 |
| | | Carbon Black (Note 2) | | | | 5.0 | 5.0 | 5.0 | 5.0 | 5.0 | 5.0 | 5.0 |
| | | TOTAL | | | | 252.7 | 252.7 | 252.7 | 252.7 | 252.7 | 252.7 | 252.7 |
| | | (A1)/(A2) SFMR[*1] | | | | 0.33 | 0.33 | 0.33 | 0.33 | 0.92 | 0.33 | 0.33 |
| | | {(A1) + (A2)}/(Base Resin) SFMR[1] | | | | 1.0 | 1.0 | 1.0 | 1.0 | 1.0 | 1.0 | 1.0 |
| | | {(A1) + (A2)}/Mel SFMR[*1] | | | | 2.33 | 2.33 | 2.33 | 2.33 | 2.33 | 2.33 | 2.33 |
| | | (Pigment)/(Resin SFMR[*1] | | | | 0.05 | 0.05 | 0.05 | 0.05 | 0.05 | 0.05 | 0.05 |
| Evaluation | | Paint film appearance | | | | ○ | ○ | ○ | ○ | ○ | Δ | ⊚ |
| | | Bubbling Resistance | | | | ⊚ | ⊚ | ⊚ | ○ | Δ | Δ | ○ |
| | | Sag Resistance | | | | ⊚ | ⊚ | ⊚ | Δ | ⊚ | ⊚ | ⊚ |

[*1]SFMR = Solid Fraction Mass Ratio
[*1]SFMR = Solid Fraction Mass Ratio

TABLE 4

|  |  |  | Mw | Tg °C. | Resin Solid Fract. | Comparative Example |  |  |  |  |  |
|---|---|---|---|---|---|---|---|---|---|---|---|
|  |  |  |  |  |  | 1 | 2 | 3 | 4 | 5 | 6 |
| First Aqueous Base Paint | (A1) | AC-1 | 20,000 | 41 | 44.5% |  |  | 39.3 | 39.3 | 157.3 |  |
|  |  | AC-7 | 200,000 | 41 | 44.5% | 39.3 |  |  |  |  |  |
|  |  | AC-8 | 5,000 | 41 | 44.5% |  | 39.3 |  |  |  |  |
|  | (A2) | PU-1 | 24,500 | −35 | 30.0% | 175.0 | 175.0 |  |  |  | 233.3 |
|  |  | PU-3 | 120,000 | −35 | 25.0% |  |  | 210.0 |  |  |  |
|  |  | PU-4 | 8,000 | −30 | 35.0% |  |  |  | 210.0 |  |  |
|  | (Mel) | Melamine Resin (Note 1) |  |  | 90% | 33.3 | 33.3 | 33.3 | 33.3 | 33.3 | 33.3 |
|  |  | Carbon Black (Note 2) |  |  |  | 1.0 | 1.0 | 1.0 | 1.0 | 1.0 | 1.0 |
|  |  | Titanium Dioxide (Note 3) |  |  |  | 99.0 | 99.0 | 99.0 | 99.0 | 99.0 | 99.0 |
|  |  | TOTAL |  |  |  | 347.7 | 347.7 | 382.7 | 382.7 | 290.6 | 366.7 |
|  |  | (A1)/(A2) SFMR*[1] |  |  |  | 0.33 | 0.33 | 0.33 | 0.33 | — | 0.00 |
|  |  | {(A1) + (A2)}/(Base Resin) SFMR[1] |  |  |  | 1.0 | 1.0 | 1.0 | 1.0 | 1.0 | 1.0 |
|  |  | {(A1) + (A2)}/Mel SFMR*[1] |  |  |  | 2.33 | 2.33 | 2.33 | 2.33 | 2.33 | 2.33 |
|  |  | (Pigment)/(Resin SFMR*[1]) |  |  |  | 1.0 | 1.0 | 1.0 | 1.0 | 1.0 | 1.0 |
| 2$^{nd}$ | (A1) | AC-1 | 20,000 | 41 | 44.5% | 39.3 | 39.3 | 39.3 | 39.3 | 39.3 | 39.3 |
|  | (A2) | PU-1 | 24,500 | −35 | 30.0% | 175.0 | 175.0 | 175.0 | 175.0 | 175.0 | 175.0 |
|  | (Mel) | Melamine Resin (Note 1) |  |  | 90.0% | 33.3 | 33.3 | 33.3 | 33.3 | 33.3 | 33.3 |
|  |  | Carbon Black (Note 2) |  |  |  | 5.0 | 5.0 | 5.0 | 5.0 | 5.0 | 5.0 |
|  |  | TOTAL |  |  |  | 252.7 | 252.7 | 252.7 | 252.7 | 252.7 | 252.7 |
|  |  | (A1)/(A2) SFMR*[1] |  |  |  | 0.33 | 0.33 | 0.33 | 0.33 | 0.33 | 0.33 |
|  |  | {(A1) + (A2)}/(Base Resin) SFMR[1] |  |  |  | 1.0 | 1.0 | 1.0 | 1.0 | 1.0 | 1.0 |
|  |  | {(A1) + (A2)}/Mel SFMR*[1] |  |  |  | 2.33 | 2.33 | 2.33 | 2.33 | 2.33 | 2.33 |
|  |  | (Pigment)/(Resin) SFMR*[1] |  |  |  | 0.05 | 0.05 | 0.05 | 0.05 | 0.05 | 0.05 |
| Assessment |  | Paint film appeal |  |  |  | X | Δ | X | Δ | X | Δ |
|  |  | Bubbling Resistance |  |  |  | Δ | ○ | Δ | ○ | X | X |
|  |  | Sag Resistance |  |  |  | ◎ | X | ○ | X | Δ | X |

*[1]SFMR = Solid Fraction Mass Ratio

Details of each of the compounded components shown in Table 3 and Table 4 are indicated below.
(Note 1) Melamine Resin (trade name Cymel 327, produced by the Cytec Industries Co., imino group-containing type methylated melamine resin, resin solid fraction 90%)
(Note 2) Carbon Black (trade name MA-100, produced by the Mitsubishi Kagaku Co.)
(Note 3) Titanium Dioxide (Trade name Ti-Pure R760, produced by the DuPont Co.)

[Discussion]

In comparison with Comparative Examples 1 to 6, excellent results were obtained with Examples 1 to 15 for all of the items evaluated. On looking at Examples 7, 9 and 11 it is clear that the molecular weight of the (A1) component is preferably lower than 90,000 and more desirably lower than 50,000. Furthermore, on looking at Examples 8 to 10 it is clear that the glass transition temperature of the (A1) component is preferably higher than 25° C. Moreover, on looking at Examples 1, 13 and 15 it is clear that the solid fraction mass ratio (A1) component/(A2) component is preferably smaller than 0.92, and more desirably smaller than 0.54.

In Comparative Examples 1 and 3 the molecular weight of the (A1) or (A2) component is too high and so the appearance of the paint film and bubbling resistance properties are not good.

In Comparative Examples 2 and 4 the molecular weight of the (A1) or (A2) component is too low and so the appearance of the paint film and sag resistance are not good.

No (A2) component is included in Comparative Example 5 and so the appearance, bubbling resistance and sag resistance are not good.

No (A1) component is included in Comparative Example 6 and so the appearance, bubbling resistance and sag resistance are not good.

The invention claimed is:

1. A method of forming a multi-layer paint film comprising:
   forming a first base paint film wherein an aqueous first base paint (A) is coated over an object which is to be painted;
   wherein the aqueous first base paint (A) includes a melamine resin and, as a base resin,
   a) a water-soluble or water-dispersible acrylic resin (A1) having a weight average molecular weight in the range of from 10,000 to less than 50,000, and
   b) a water-soluble or water-dispersible resin (A2), selected from the group consisting of polyester resins, polyurethane resins, and acrylic-urethane resins, the water-soluble or water-dispersible resin (A2) having a weight average molecular weight in the range of from 10,000 to 100,000;
   forming a second base paint film wherein an aqueous second base paint (B) comprising a melamine resin, an acrylic resin according to (A1) and a polyurethane resin according to (A2) is coated over the first base paint film without curing;
   forming a clear paint film wherein a clear paint (C) is coated over the second base paint film without curing; and
   heating and curing the first base paint film, the second base paint film, and the clear paint film at the same time.

2. The method of forming a multi-layer paint film of claim 1, wherein the solid fraction mass ratio represented by the (A1) component/the (A2) component is from 0.3 to 0.6.

3. The method of forming a multi-layer paint film of claim 1, wherein the glass transition temperature of the (A1) component is from 30 to 80° C.

4. The method of forming a multi-layer paint film of claim 1, wherein the glass transition temperature of the (A2) component is from −50 to 0° C.

5. The method of forming a multi-layer paint film of claim 1, wherein the solid fraction mass ratio represented by the (A1) component+the (A2) component/the whole of the solid fraction of the base resin of the first aqueous base paint (A) is at least 0.8.

6. The method of forming a multi-layer paint film of claim 1, wherein the second aqueous base paint (B) includes as base resin a water-soluble or water-dispersible resin having a weight average molecular weight in the range of from 10,000 to 100,000.

\* \* \* \* \*